United States Patent
Lambert et al.

(10) Patent No.: US 6,280,554 B1
(45) Date of Patent: Aug. 28, 2001

(54) MANUFACTURING METHOD FOR A DRIP IRRIGATION CONDUIT, MANUFACTURING LINE FOR THE IMPLEMENTATION THEREOF AND CONDUIT OBTAINED THEREBY

(75) Inventors: Gilles Lambert, Montbredlloz; Bruno Buluschek, Echandens, both of (CH)

(73) Assignee: Swisscab S.A., Yvonand (CH)

( * ) Notice: Subject to any disclaimer, the term of this patent is extended or adjusted under 35 U.S.C. 154(b) by 0 days.

(21) Appl. No.: 09/343,726

(22) Filed: Jun. 30, 1999

(30) Foreign Application Priority Data

Jul. 8, 1998 (EP) .................................................. 98112645

(51) Int. Cl.$^7$ .................................................. B29C 47/02
(52) U.S. Cl. .............................. 156/244.12; 156/244.13; 156/244.27; 156/253; 156/294; 156/322; 156/500; 156/552
(58) Field of Search ........................ 156/244.12, 244.13, 156/244.15, 244.19, 244.27, 253, 294, 298, 309.9, 423, 500, 513, 543, 552, 583.5, 322

(56) References Cited

U.S. PATENT DOCUMENTS

| | | | |
|---|---|---|---|
| 3,619,316 | * 11/1971 | Ishida | 156/77 |
| 5,271,786 | 12/1993 | Gorney et al. | 156/229 |
| 5,282,916 | 2/1994 | Bloom | 156/244.13 |
| 5,324,371 | * 6/1994 | Mehoudar | 156/64 |
| 5,324,379 | 6/1994 | Eckstein | 156/244.13 |
| 5,676,897 | 10/1997 | Dermitzakis | 264/167 |
| 5,711,214 | * 1/1998 | Lauderbaugh et al. | 156/583.5 |
| 5,744,779 | 4/1998 | Buluschek | 219/121.71 |
| 5,862,652 | * 1/1999 | Schoeler | 53/551 |
| 5,902,047 | * 5/1999 | Yeager | 383/203 |
| 6,039,270 | * 3/2000 | Dermitzakis | 239/542 |

FOREIGN PATENT DOCUMENTS 0 715 926 A1   6/1996   (EP) .
0 872 172 A1   10/1998  (EP) .

* cited by examiner

*Primary Examiner*—Michael W. Ball
*Assistant Examiner*—Barbara J. Musser
(74) *Attorney, Agent, or Firm*—Griffin & Szipl, P.C.

(57) ABSTRACT

The method consists of introducing the dripper units (1) one after the other inside a conduit (2) while the latter is being formed in an extruder (10), then calibrated in a calibrator (13), heat welding the dripper units (1) to the inner wall (3) of the conduit (2) gradually as it progresses downstream of the extruder (10), then cooling the conduit (2) and perforating it opposite each dripper unit (1) to make it communicate with the exterior.

According to the invention, the heat welding operation is executed downstream of the calibrator (13) by pinching the dripper unit and the wall of said conduit between first and second opposing surfaces (20, 22b) one of which is driven at the speed of progression of the conduit (2) and the other is arranged on a fixed support member (16) forming a feed guide for the dripper units (1). The dripper units are presented for the pinching operation one after the other contiguously by their ends.

21 Claims, 1 Drawing Sheet

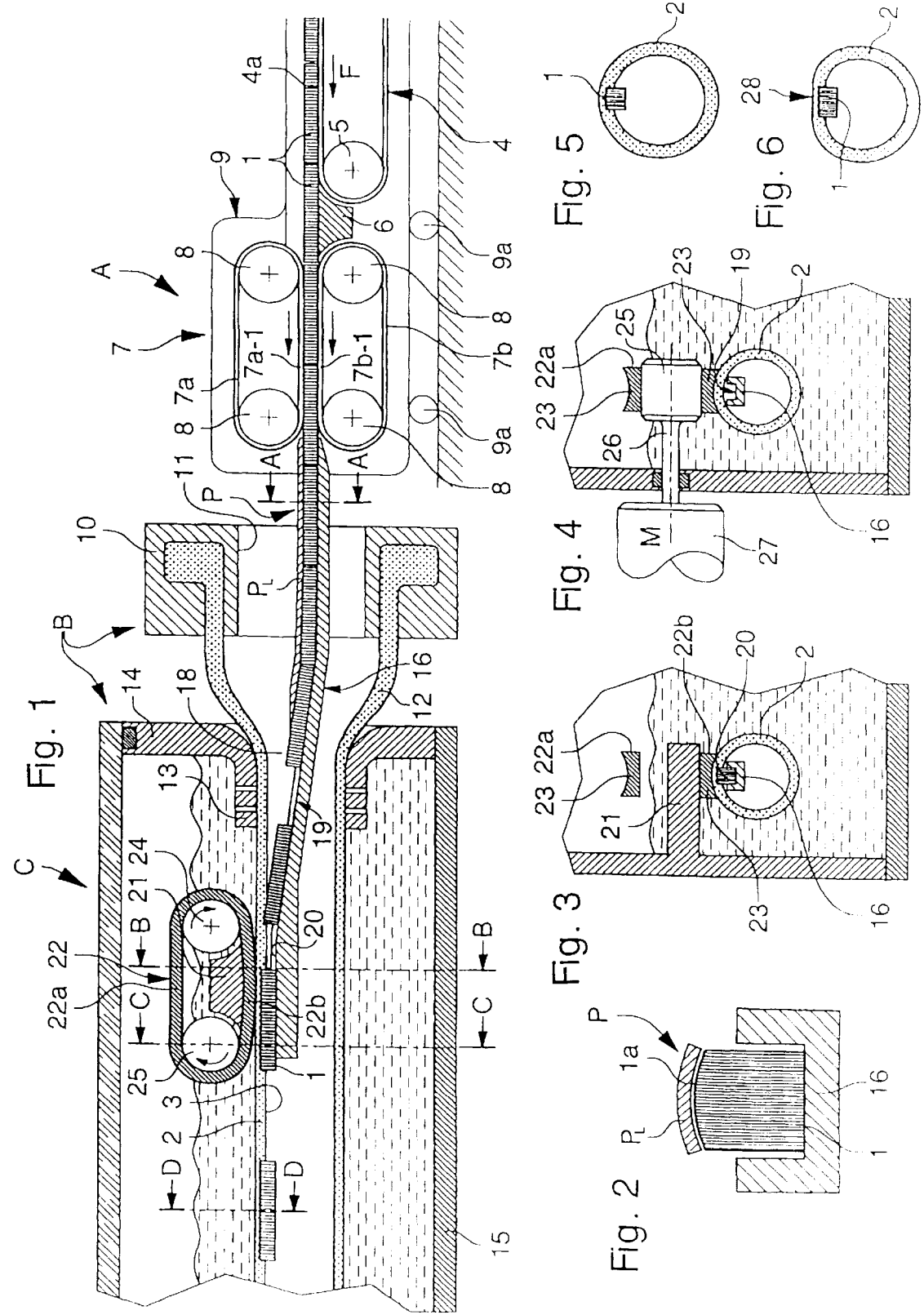

MANUFACTURING METHOD FOR A DRIP IRRIGATION CONDUIT, MANUFACTURING LINE FOR THE IMPLEMENTATION THEREOF AND CONDUIT OBTAINED THEREBY

The present invention relates to the manufacture of drip irrigation conduits.

A manufacturing method for such a conduit is already disclosed in European Patent Application No. 98106765 and is of the type consisting in:

manufacturing dripper units, introducing said dripper units one after the other inside said conduit while the latter is being formed in an extruder, then calibrated in a calibrator, and heat welding said dripper units to the inner wall of the conduit during its progression downstream from said extruder then cooling said conduit and perforating the latter opposite each dripper unit to make it communicate with the exterior.

According to this known method, the dripper units are introduced into the conduit being formed using a thread onto which the dripper units are secured at a regular distance from each other, the distance between them determining that at which they will be fixed to the inside of the conduit. The traction force on the succession of dripper units results from that exerted by the last dripper unit which has just been heat welded to the inner wall of the conduit. This means that, before passing through the centre of the extruder the dripper units move forwards at the speed of the conduit in formation, otherwise the thread is liable to break. This results in a complication for the installation, since means must be provided not only for manipulating the thread, but also for preventing the breakage thereof.

Moreover, according to the principle of this device, the dripper unit which has just been welded to the inner wall of the conduit pulls, via the thread, the following dripper units and allows them to move forward. Tests have shown that the forces set in play for the traction of the following dripper units systematically lead to more or less significant tearing of the back of the dripper unit which has just been welded, which makes the conduit unusable.

Another drawback of this method consists in that it does not allow satisfactory preheating of the face of the dripper units intended to come into contact with the inner wall of the conduit to facilitate the welding thereof to the latter, given the high speed at which the dripper units attached to the thread move forward prior to welding. This leads on the one hand to a more complex design of the dripper units (smaller contact surface with the conduit) and on the other hand, to using adhesive materials or materials with a lower softening point which are ill suited to the injection moulding technique, which makes the manufacture of the dripper units difficult and expensive.

The object of the invention is to overcome these drawbacks.

The invention thus concerns a manufacturing method of the type indicated hereinbefore which is characterised in that:

said heat welding step is executed downstream of said calibrator by pinching the dripper unit and the wall of said conduit between first and second opposing surfaces, one of which is driven at the speed of progression of the conduit and the other is arranged on a fixed support member forming a feed guide for the dripper units.

As a result of these features, the dripper units are fed individually by the guide forming a support surface and acquire the speed of the conduit only during the short moment when they undergo pinching against the inner wall of the conduit and while they are heat welded to the inner wall. Consequently, the manufacturing line can be considerably simpler. It will also be noted that the distance between the dripper units in the finished conduit is obtained without other means or any additional steps.

According to a preferred embodiment, the dripper units are presented for the pinching step one after the other contiguously by their ends.

It is thus possible to cause the dripper units to advance at the desired speed and to vary the pitch at which the dripper units are fixed in the conduit at will by increasing or decreasing the feed speed of the dripper units into the pinching station.

According to an advantageous embodiment, the method of the invention further includes an additional step consisting in preheating the face of the dripper units intended to be turned towards the inner wall of the conduit before the latter are pinched between the inner wall of the conduit and the first and second opposing walls.

This facilitates, in particular, the welding of the dripper unit to the conduit, which cannot in certain cases (small thickness of its wall), provide the quantity of heat necessary to the dripper unit to achieve high quality welding.

The invention also concerns a manufacturing line for the implementation of the method according to the invention, including a dripper unit feed station, followed by a station for the extrusion and calibration of said conduit and a conduit cooling station, said line being characterised in that downstream of said extrusion and calibration station a pinching station for pressing each dripper unit against the inner face of said conduit during a heat welding operation is provided, and in that a guide for the dripper units links said feed station to said pinching station passing through said extrusion and calibration station, said guide defining a support surface for said dripper units in said pinching station.

The invention also concerns a conduit obtained via the method of the invention, characterised in that it includes dripper units whose face turned towards said conduit is flat and in that opposite each dripper unit, said conduit has, in cross-section, a section which is flattened on the side on which each dripper unit is situated.

Complementary features of the method, the manufacturing line and the conduit according to the invention are defined in the dependent claims.

Other features and advantages of the invention will appear during the following description, given solely by way of example and made with reference to the annexed drawings, in which:

FIG. 1 is a schematic lateral elevation view of a manufacturing line for a drip irrigation conduit for implementing the method according to the invention;

FIGS. 2 to 5 are cross-sections taken respectively along the lines A—A, B—B, C—C and D—D of FIG. 1, and FIG. 6 is a cross-section of a drip irrigation conduit manufactured according to a variant of the method of the invention.

The manufacturing line, shown by way of example in FIG. 1 for the implementation of the manufacturing method according to the invention, includes a feed station A for dripper units 1, an extrusion and calibration device B for conduit 2 and a pinching station C in which dripper units 1 are brought into contact with the inner face of conduit 2 to adhere thereto. The direction of progression of the manufacturing steps is from right to left in FIG. 1.

As regards dripper units 1, it should be noted that any type of dripper unit known in the industry can be used during the implementation of the invention, a particularly appropriate type being that which is described in the aforecited European Patent Application to which reference can be made for more detail. For the purposes of the present description, it need only be noted that the dripper units have the general shape of a parallelepiped rectangular block made of plastic material, and that one determined face 1*a* (FIG. 2) among the large faces thereof, which preferably has a slightly convex cylindrical shape, must be turned towards inner wall 3 of conduit 2.

This is why upstream of feed station A there is a bowl feeder (not shown and known to those skilled in the art) allowing dripper units 1 to be placed in feed station A in conformity with the position which they have to have, once they are introduced into conduit 2, i.e. if necessary, with convex face 1*a* turned upwards.

Feed station A includes an endless conveyor belt 4 of which the downstream pulley 5 can be seen in FIG. 1. The belt moves in the direction of arrow F and it is connected to driving means (not shown), for example an electric motor, for this purpose. Dripper units 1 leaving the bowl feeder are brought on the upper strand 4*a* of endless conveyor belt 4 one behind the other, their end faces being contiguous. A transfer support member 6 is provided downstream of endless conveyor belt 4 for pushing dripper units 1 into a caterpillar 7.

Caterpillar 7 includes two endless respectively upper and lower belts 7*a* and 7*b*, the adjacent strands 7*a*-1 and 7*b*-1 of the two belts being placed at a vertical distance from each other which is equal or very slightly less than the height of a dripper unit 1. The two belts 7*a* and 7*b* pass over respective pulleys 8 and are driven in the direction of the arrows by motor means (not shown) imparting a linear speed $V_7$ thereto.

It will be noted that feed station A includes a base plate 9 on which are mounted belt 4 and caterpillar 7 and which can itself be moved along the direction of movement of the method as a result of wheels 9*a* or other appropriate roller type means in order to be able to regulate the position of the assembly with respect to extrusion and calibration device B which will now be described.

This device includes an extrusion head 10 having a central bore 11 and able to be of any known type. It enables a conduit 12 to be continuously made which is fed into a calibrator 13 where the conduit is given its definitive configuration. Calibrator 13 incorporates the upstream wall 14 of a vacuum tank 15 filled with a cooling liquid such as water.

Guide 16 is formed by a U-section member (FIG. 2) which opens upwards, which leads from the downstream end of caterpillar 7 upstream passing successively through extrusion head 10, tube blank 12 and calibrator 13. The passage defined by this U-section member 16 is of rectangular cross-section the dimensions of which correspond to the outer cross-section of dripper units 1. It will be recalled that the dripper units shown in FIGS. 1 to 5 can have a slightly convex upper face as is seen in particular in 1*a* of FIG. 2. However, this shape can be selected according to requirements, the dripper units being able to take different shapes, or have imperfections of shape like seams resulting from moulding, deformations or other irregularities without this having an unfavourable effect on the proper course of the manufacturing method according to the invention.

Guide 16 extends beyond calibrator 13 into conduit 2. In the region of the inlet portion of calibrator 13, the bottom of guide 16 gradually raises upwards forming a ramp 19 which transforms into a horizontal support surface 20 at the end of the guide.

Above support surface 20 of guide 16, the wall of vacuum tank 15 has a fixed console or shoe 21 extending horizontally inwards and forming a counter-support. This console 21 extends transversely between the upper 22*a* and lower 22*b* strands of an endless conveyor belt 22, it being understood that lower strand 22*b* is in contact with the lower face of console 21, endless conveyor belt 22 being arranged downstream of the calibrator and preferably immediately at the outlet of the latter. The profile of the endless conveyor belt can be adapted to the shape of the face of the dripper unit (flat or convex shape), but preferably the surface of belt 22*a* has a soft consistency, which can be obtained by coating it with a lining 23 made of rubber or foam, a polyurethane foam for example being suitable for this purpose.

The belt passes over two pulleys 24 and 25, one of them 25 being coupled, via a spindle 26 passing through the wall of tank 15, to a driving motor 27 which drives the belt in the direction of the arrows.

The manufacturing line shown in the Figures further includes a preheating station P for dripper units 1, arranged between feed station A for dripper units 1 and said pinching station C. This preheating station P includes preheating means which extend from feed station A through said extrusion station to calibrating station B. In the embodiment example described, the preheating means are electric resistor heating means which include a metal strip or plate $P_1$ and extend above said guide 16 from said feed station A to said calibrating station passing through the extrusion station, plate $P_1$ being connected in short-circuit to an electric power supply (not shown).

It will be noted in this regard that plate $P_1$ preferably has a profile which matches the shape of the face of the dripper units which is intended to be welded to the inner wall of the conduit (FIG. 2). In order to provide an idea, the thickness of plate $P_1$ is for example of the order of 0.2 mm and this plate enables dripper units 1 to be heated to a temperature comprised between 90° and 160° and preferably a temperature of the order of 140°.

Preferably, plate $P_1$ is elastic and is fixed to one end of guide 16. It will also be noted that plate $P_1$ is arranged to apply, preferably in an elastic manner, dripper units 1 onto the bottom of guide 16. Thus, the dripper units are in permanent and tight contact with plate $P_1$, which allows the dripper units to be preheated efficiently.

The course of the manufacturing method is as follows.

Endless conveyor belt 4 continuously feeds dripper units 1 which it receives from an attitude determination device (not shown) such as a bowl feeder. The speed of belt 4 is adjusted to a value $V_1$ which is selected to be higher than maximum speed $V_1$ at which the dripper units can move forward in the manufacturing line. As a result the dripper units slide over the surface of belt 4.

Having been transferred into caterpillar 7, dripper units 1 are fed at a predefined speed $V_7$ which is selected to have a much lower value than that of speed $V_2$ at which conduit 2 progresses through calibrator 13 and the downstream portion of the manufacturing line.

During this progression, the face of the dripper units which is intended to be turned towards the inner wall of conduit 2 prior to the dripper units being pinched between the inner wall of the conduit and said first and second opposing walls, is preheated.

The preheating temperature depends upon the nature of the material of the dripper units and is generally comprised between 90° and 160° and is preferably of the order of 140°.

A value for speed $V_7$ is preferably selected so that:

$$V_7 = V_2 19\ I/d$$

where I is the length of a dripper unit 1 and d the distance at which two successive dripper units must be spaced in the finished conduit. For example, if $V_2$=100 m/min, I=30 mm and d=1 m, the speed of belt 7 will be $V_7$=3 m/min. This calculation demonstrates that it is possible according to the invention to achieve efficient preheating of the dripper units prior to the welding thereof to the conduit.

Dripper units 1 are thus pushed into guide 16 where they progress at speed $V_7$ without being in contact with conduit 2 being formed but in contact with elastic plate P of the preheating device, until they arrive at the top of ramp 19 and are engaged on support surface 20. On arriving on this surface, the dripper units come into contact with inner wall 3 of the conduit which has a linear speed $V_2$ and are driven at this same speed.

It will be noted in passing that it has been observed that the welding against the inner surface of the conduit is better than in conventional methods. This is due, on the one hand, to the fact that the conduit itself grips each dripper unit and moves it at its own speed $V_2$ and, on the other hand, to the fact that the dripper units are preheated.

Belt 22 rotates at a linear speed $V_{22}$ substantially equal to speed $V_2$ of conduit 2 at this location. Thus, for a short moment, each dripper unit 1 is sandwiched between support surface 20 and the inner surface of conduit 2, this latter in turn abutting, but without friction, against lower strand 22b of belt 22. Since this lower strand 22b itself abuts against the lower surface of console 21, dripper unit 1 and the portion of the wall of the conduit situated at that moment in pinching station C are pinched, resulting in the fixing by heat welding of the dripper unit to the inner wall of the conduit.

Given the softness of lining 23 of belt 22, the latter has no difficulty in matching the shape imprinted by face 1a of the dripper unit onto conduit 2. The shape of this face 1a can thus be selected as a function of requirements without the belt needing to be changed. In particular, its face can be convex as is shown in FIG. 2, but also flat as is shown in FIG. 6. Moreover, defects in the shape of the dripper unit have no effect on the quality of the welding of the dripper unit onto wall 3 of conduit 2.

FIG. 6 also shows that in the event that the face of the dripper unit in contact with conduit 2 is flat, the final shape of the conduit can have a rectilinear section 28 in cross-section. This can be advantageous to indicate to the user of a conduit according to the invention the locations at which the dripper units are situated.

The fact of pressing each dripper unit 1 against inner wall 3 of conduit 2 at the moment of welding, i.e. when the conduit is still soft and warm, means that a portion of the dripper unit melts and is welded against the conduit. Preferably, the contact face of the dripper unit is especially designed to facilitate this operation.

Moreover, cooling of conduit 2 in calibrator 13 below belt 22 means that the exterior of the conduit is already cool, while the interior is still warm given the poor thermal conductivity of plastic materials. Moreover, at this location, the conduit has only been in very little contact with the cooling water.

It will be noted that the fact that the exterior of the conduit has already hardened at the moment when the dripper unit comes into contact with the still warm interior of the conduit allows the risk of piercing the conduit being formed to be significantly limited. In order to provide an idea, for a conduit having a wall of 0.2 mm thickness, penetration of the dripper units is of the order of a tenth of a millimetre, more or less five hundredths.

Conduit 2 fitted with its dripper units 1 then leaves tank 15, passes in a conventional manner through cooling tanks, a drier, a perforation station for making holes opposite the dripper units and a take up wheel.

It goes without saying that the invention is not limited to the embodiment which has just been described and that modifications or variants can be envisaged without departing from the scope of the invention. One could in particular envisage omitting the preheating of the dripper units prior to welding. In this case, guide 16 could have the shape of a tube whose inner passage is adjusted to shape of the dripper units, this tube having an opening facing the calibrator.

The invention has numerous advantages. As a result of the method and the manufacturing line which have just been described, it is not necessary to adapt the radius of curvature of the face of the dripper unit intended to be turned towards the wall of the conduit to the diameter of the latter, and thus to that of the calibrator. Indeed, the soft or flexible consistency of endless conveyor belt 22 allows it to adapt to the shape of the dripper unit, which can if necessary be deformed. This allows homogeneous welding of the dripper unit onto the conduit without any risk of the deterioration thereof, which would be the case if such dripper units were brought into contact with the conduit in the calibrator, i.e. against a rigid surface.

The invention thus makes the radius of curvature of the dripper units independent of the diameter of the conduits to be manufactured and thus allows the problem of inventory management of the dripper elements and its related manufacturing the problems to be removed.

What is claimed is:

1. A method for manufacturing a drip irrigation conduit comprising the steps of:

providing dripper units;

forming a conduit having an inner wall, in a downstream direction, at speed of progression, with an extruder and calibrating the conduit with a calibrator;

introducing said dripper units one after another in a way that one pushes the other inside said conduit while the conduit is being formed in the extruder and calibrated with the calibrator;

heat welding said dripper units to the inner wall of the conduit downstream from said extruder and said calibrator, then cooling said conduit and perforating the conduit opposite each dripper unit to make each dripper unit communicate with an exterior of the conduit, wherein said heat welding step is executed downstream of said calibrator by bringing the dripper units into contact with the inner wall of the conduit and pinching the dripper unit and the wall of said conduit between first and second opposing surfaces, one of the opposing surfaces being driven at the speed of progression of the conduit and supported by a fixed surface, the other of the opposing surfaces being arranged on a fixed support element forming a feed guide for the dripper units.

2. A manufacturing method according to claim 1, wherein said dripper units are presented for the pinching step one after the other contiguously by their ends.

3. A manufacturing method according to claim 1, wherein the feed speed $V_7$ at which said dripper units progress in said guide follows the following relationship:

$$V_7 = V_2 \cdot I/d$$

Where I is the length of a dripper unit, d the distance between two dripper units and $V_2$ the speed of progression of the conduit.

4. A manufacturing method according to claim 1, wherein said first opposing surface is shaped so as to adapt to a shape of a face of each dripper unit heat welded to the inner wall of the conduit.

5. A manufacturing method according to claim 4, wherein said first surface is soft so as to adapt to any shape of said face of the dripper unit heat welded to the inner wall of the conduit.

6. A manufacturing method according to claim 1, further comprising the step of cooling the conduit with a cooling liquid, wherein the pinching step is executed immediately downstream of said calibrating step, contemporaneously with the step of cooling.

7. A manufacturing method according to claim 1, further including an additional step comprising preheating a face of the dripper units to be heat welded to the inner wall of the conduit, before said dripper units are pinched between the inner wall of the conduit and said first and second opposing surfaces.

8. A manufacturing method according to claim 7, wherein the preheating step comprises preheating the dripper units to a temperature between 90° and 160° C.

9. A manufacturing line for the manufacture of drip irrigation conduits, comprising:
   a feed station to feed dripper units;
   an extrusion station producing an extruded conduit having an inner wall, in a downstream direction, at a speed of progression;
   a calibration station calibrating the extruded conduit;
   a conduit cooling station cooling the extruded conduit;
   a pinching station downstream of said extrusion and calibration stations, pressing each dripper unit against the inner face of said conduit to heat weld a face of each dripper unit to the inner face of the conduit, said pinching station including an endless conveyor belt having a surface moving in the downstream direction of said conduit and in contact with said conduit; and
   a guide for the dripper units leading from said feed station to said pinching station passing through said extrusion and calibration stations, and defining a support surface for said dripper units in said pinching station; and
   wherein, in the pinching station, the dripper units are pinched between the conduit and the surface of the conveyor belt on one side and the support surface on another side.

10. A manufacturing line according to claim 9, wherein said endless conveyor belt is provided with a driving motor driving the conveyor belt at the speed of progression of said conduit.

11. A manufacturing line according to claim 9, further comprising a fixed member interposed between strands of said endless conveyor belt to provide a support surface for the surface of said belt which is in contact with said conduit.

12. A manufacturing line according to claim 11, wherein said pinching station is placed in cooling liquid of said cooling station and wherein said fixed member is fixed to said cooling station.

13. A manufacturing line according to claim 9, wherein said belt is coated with a foam material.

14. A manufacturing line according to claim 9, wherein said guide includes a U section member which is open upwards and has an inner passage adjusted to a shape of said dripper units, and wherein said guide has, opposite a calibrator of said calibration station, a ramp surface leading said dripper units towards said support surface of the guide.

15. A manufacturing line according to claim 9, further comprising a dripper unit preheating station, arranged between the feed station for the dripper units and said pinching station.

16. A manufacturing line according to claim 15, wherein said preheating station includes preheating means which extend from the feed station through said extrusion station to inside the calibration station.

17. A manufacturing line according to claim 16, wherein the preheating means are electric resistor heating means.

18. A manufacturing line as claimed in claim 15, wherein said preheating means are electric resistor heating means including a metal plate extending above said guide from said feed station to inside said calibration station through the extrusion station, said plate being connected in short circuit to an electric voltage source.

19. A manufacturing line according to claim 18, wherein said plate is elastic and fixed to one end of said guide and arranged to apply the dripper units onto the bottom of said guide.

20. A manufacturing line according to claim 10, wherein a fixed member is interposed between the strands of said endless conveyor belt to provide a support surface for the strand of said belt which is in contact with said conduit.

21. A manufacturing method according to claim 7, wherein the preheating step comprises preheating the dripper units to a temperature of approximately 140° C.

* * * * *